US006894969B1

(12) United States Patent
Chidambaran et al.

(10) Patent No.: US 6,894,969 B1
(45) Date of Patent: May 17, 2005

(54) APPARATUS AND METHOD FOR REDUNDANCY OF PROCESSING MODULES INTERFACED TO A SWITCHING CORE

(75) Inventors: P K Chidambaran, Santa Clara, CA (US); Thomas A Hoch, Boxborough, MA (US); John Patrick Jones, Westford, MA (US); Andrew A Long, Northborough, MA (US); Prasasth R Palnati, Westford, MA (US); Ronald M Parker, Boxboro, MA (US); Raymond J Schmidt, Stoughton, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 660 days.

(21) Appl. No.: 09/711,997

(22) Filed: Nov. 14, 2000

(51) Int. Cl.[7] .............................. H04J 1/16; H04J 3/14
(52) U.S. Cl. ...................... 370/216; 370/218; 370/217
(58) Field of Search ................................ 370/216, 218, 370/217, 245, 219, 220, 221, 241, 244, 248, 250; 709/226; 714/100, 1, 2

(56) References Cited

U.S. PATENT DOCUMENTS

| | | | | |
|---|---|---|---|---|
| 5,621,720 A | * | 4/1997 | Bronte et al. | 370/241 |
| 6,351,452 B1 | * | 2/2002 | Koenig et al. | 370/217 |
| 6,359,859 B1 | * | 3/2002 | Brolin et al. | 370/218 |
| 6,625,650 B2 | * | 9/2003 | Stelliga | 709/226 |
| 6,657,969 B1 | * | 12/2003 | Neuendorff et al. | 370/245 |

* cited by examiner

*Primary Examiner*—Ajit Patel
(74) *Attorney, Agent, or Firm*—Matthew J. Hodulik

(57) ABSTRACT

The present invention is a core interface mechanism that permits 1:N type port protection on the core side of the switch such that core bandwidth is not wasted by the direct connection of service cards to the switching core. In an exemplary embodiment, a core interface module supports up to two active service cards and one dedicated protection service card. To provide increased efficiency and lower cost the redundant service card does not strand user bandwidth in the switch core. In an exemplary embodiment, the core interface includes a plurality of core side input and output ports for coupling to the switching core and a plurality of card side input and output ports for coupling to the service cards. A data flow switch function couples between the core side ports and the card side ports. The data flow switch function operates to complete data flow paths between the core side ports and the card side ports. A link failure detector detects a communications failure on a communications link associated with one of the active service cards and alters the data flow switch function such that one or more of said data flow paths associated with one of the active service cards are switched to one of said protection cards. The bandwidth allotment between the service cards and the interface device is generally greater than available bandwidth between the switching core and the interface device, thereby enabling connection of the protection cards without corresponding usage of switching core bandwidth.

25 Claims, 7 Drawing Sheets

US 6,894,969 B1

APPARATUS AND METHOD FOR REDUNDANCY OF PROCESSING MODULES INTERFACED TO A SWITCHING CORE

FIELD OF THE INVENTION

The present invention relates generally to communication systems and more particularly to packet switching systems having redundancy protection.

BACKGROUND OF THE INVENTION

Multiservice switches used, for example, by communications providers in wide area networks typically provide a number of different interfaces for incoming and outgoing communications traffic to the core switching fabric in order to accommodate customer needs. These interfaces can range, for example, from high rate optical trunking ports to lower rate electrical interfaces. In general, the different interfaces are provided through service specific equipment grouped together on what are termed "service shelves", where the service shelves then couple to the switching core. A typical service shelf will include the physical layer interface which couples to higher layer service cards (e.g. layer 2 or 3 for ATM or IP) and then to the switching core. Failure protection of equipment utilized in multiservice switches usually in the form of redundant circuit paths is also extremely important in order to provide the type of reliability that is necessary for these switches. Accordingly, extra service cards (or protection cards) are often provided within a service shelf to allow for the required protection.

In prior art multiservice switches of the type described above, the service cards from the service shelves are directly connected either logically or physically to a core port on the switching core. In accordance with this type of connection, a service card failure makes the core port(s) having the failed card thereon unavailable to the user which in turn degrades overall system bandwidth. The manner in which prior art systems provide service card redundancy is considered a major limitation in that a significant amount of core bandwidth is wasted upon failure of a service card. In addition, core bandwidth is wasted by the need to dedicate additional core ports in order to provide redundancy. Accordingly, there is a need to preserve maximum overall system bandwidth in a packet switching system while at the same time incorporating protection of various service modules.

SUMMARY OF THE INVENTION

The present invention is a core interface mechanism that permits 1:N type port protection on the core side of the switch such that core bandwidth is not wasted by the direct connection of service cards to the switching core. In an exemplary embodiment, a core interface module supports up to two active service cards and one dedicated protection service card. To provide increased efficiency and lower cost the redundant service card does not strand user bandwidth in the switch core. In an exemplary embodiment, the core interface includes a plurality of core side input and output ports for coupling to the switching core and a plurality of card side input and output ports for coupling to the service cards. A data flow switch function couples between the core side ports and the card side ports. The data flow switch function operates to complete data flow paths between the core side ports and the card side ports. A link failure detector detects a communications failure on a communications link associated with one of the active service cards and alters the data flow switch function such that one or more of said data flow paths associated with one of the active service cards are switched to one of said protection cards. The bandwidth allotment between the service cards and the interface device is generally greater than available bandwidth between the switching core and the interface device, thereby enabling connection of the protection cards without corresponding usage of switching core bandwidth.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

Multiservice switches used by communications providers for wide area networks typically provide a number of different interfaces for access to and from the core switching fabric in order to accommodate customer needs. As discussed in the background, the different interfaces may be provided through service shelves which then couple to the switching core.

Figure 1:
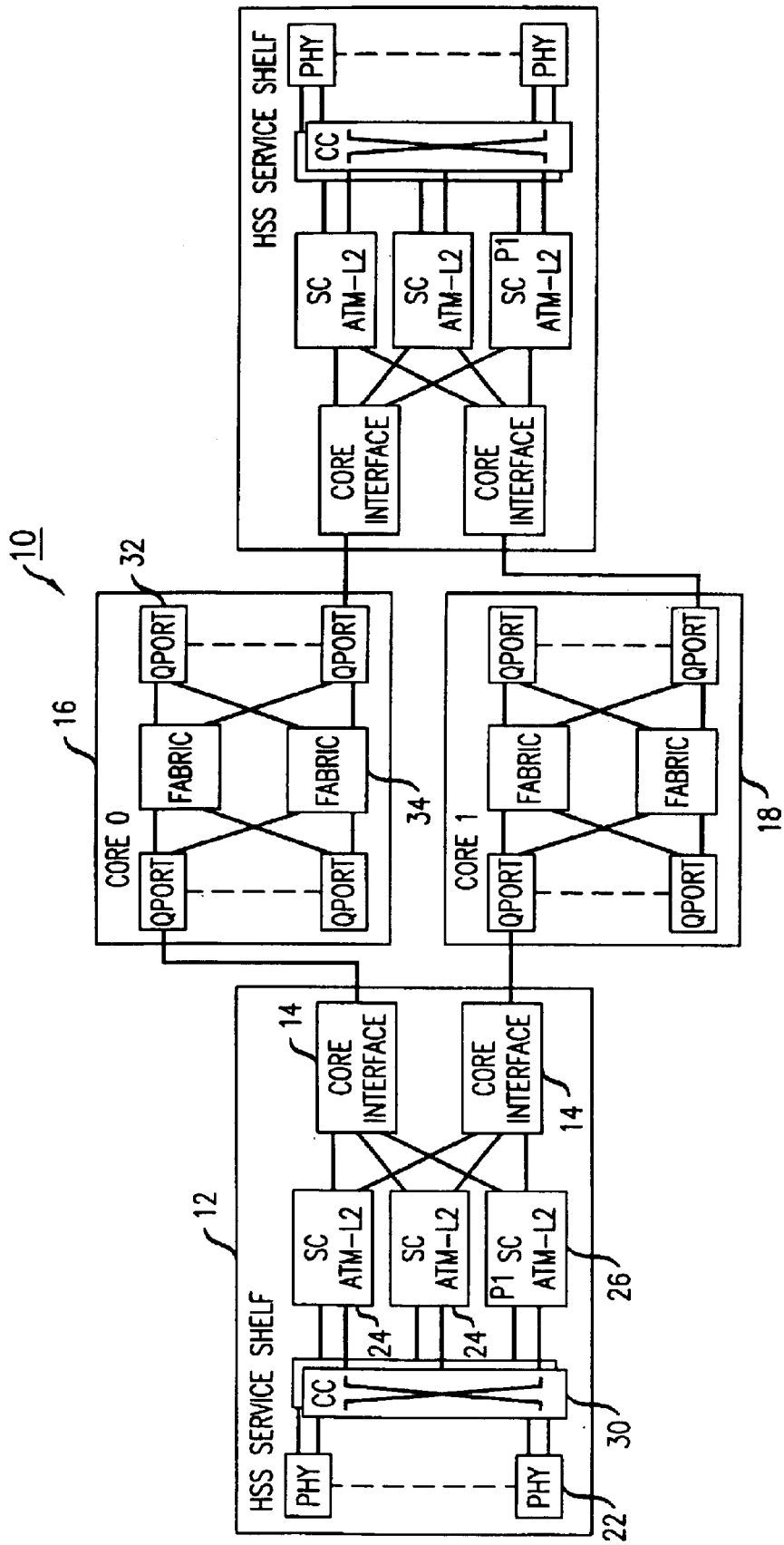
FIG. 1 is a high level diagram of a multiservice switch incorporating the core interface device of the present invention.

The present invention is a core interface mechanism that permits 1:N type port protection on the core side of the switch such that core bandwidth is not wasted by the direct connection of service cards to the switching core. Referring to FIG. 1, there is shown one exemplary embodiment of a multiservice switch 10. The switch includes a service shelf 12 which incorporates the core interface 14 of the present invention. As would be understood, the functional blocks illustrated in the figure may take the form of one or more cards or modules that are insertable into a rack or other similar type system. The service shelf 12 couples to first and second redundant switching cores 16, 18. A second service shelf 20 couples to what can be considered the output side of the switching cores.

As shown, the general makeup of the service shelf 12 includes a physical layer interface card 22 which is a user interface that can be an optical or electrical interface, e.g., DS3, OC-12, OC-48, OC-192, etc. In the case of the high speed shelf shown, the physical layer is generally a high density optical interface such as OC-48 or OC-192. The physical layer card 22 couples to higher level service cards 24, 26 (for example, layer 2 or layer 3 for ATM or IP) through a cross connect device, for example, a SONET STS-1 level cross-connect. The service cards 24 couple to the switching core through core interface modules 14. As shown, the switching cores 16, 18 are traditional switch cores including input/output ports 32 as well as switching fabrics 34.

The interface mechanism between the service cards 12 and the core 16, 18 provides redundancy protection between the service cards and core without the requirement that extra core bandwidth be allotted for the protection cards. As shown in the exemplary embodiment, two on-line ATM service cards 24 are protected by one back-up or protect service card 26. The core interface card 14 permits routing of core data to and from any of the three cards. In addition, the protection card 26 can be switched in place without the corresponding re-routing having to be known to the rest of the system.

Figure 2:
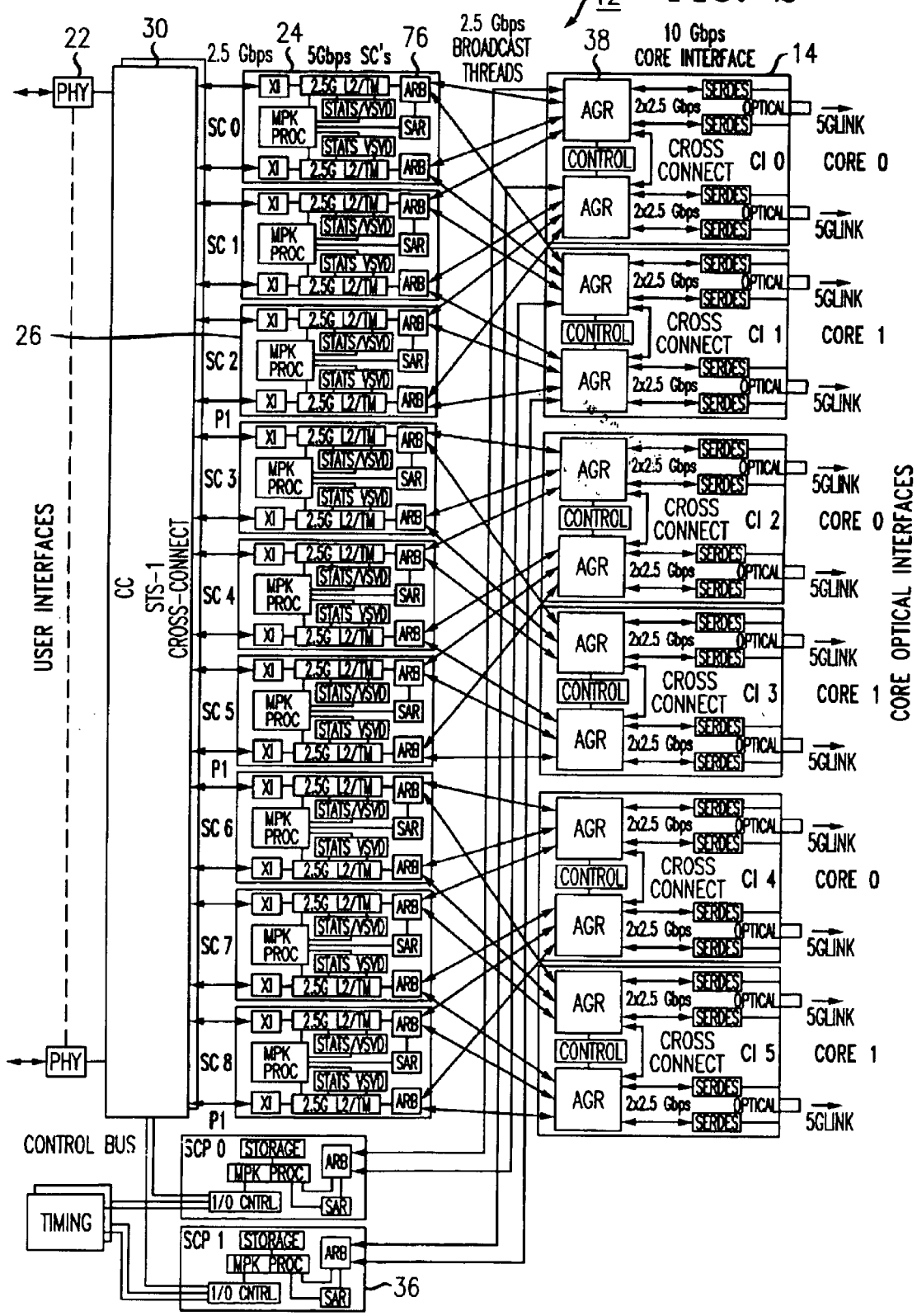
FIG. 2 is an exemplary block diagram of a high speed service shelf in accordance with the present invention.

Referring to FIG. 2, a detailed block diagram of a service shelf 12 in accordance with the present invention is shown. FIG. 2 illustrates the interface between the service cards 24, 26 and the switching core via the core interface modules 14, where the specific interconnects between the service cards and the core interface are shown. In the exemplary embodiment, the service shelf 12 includes nine service cards (SC0–SC8) which couple, respectively, to six core interface cards (C10–C15). As in FIG. 1, two online service cards 24 and one protect service card 26 couple to the switching cores through each core interface card providing 1:2 redundancy. Also included in the service shelf are shelf control processor cards 36 which handle administrative processing functions for the shelf.

Figure 3:
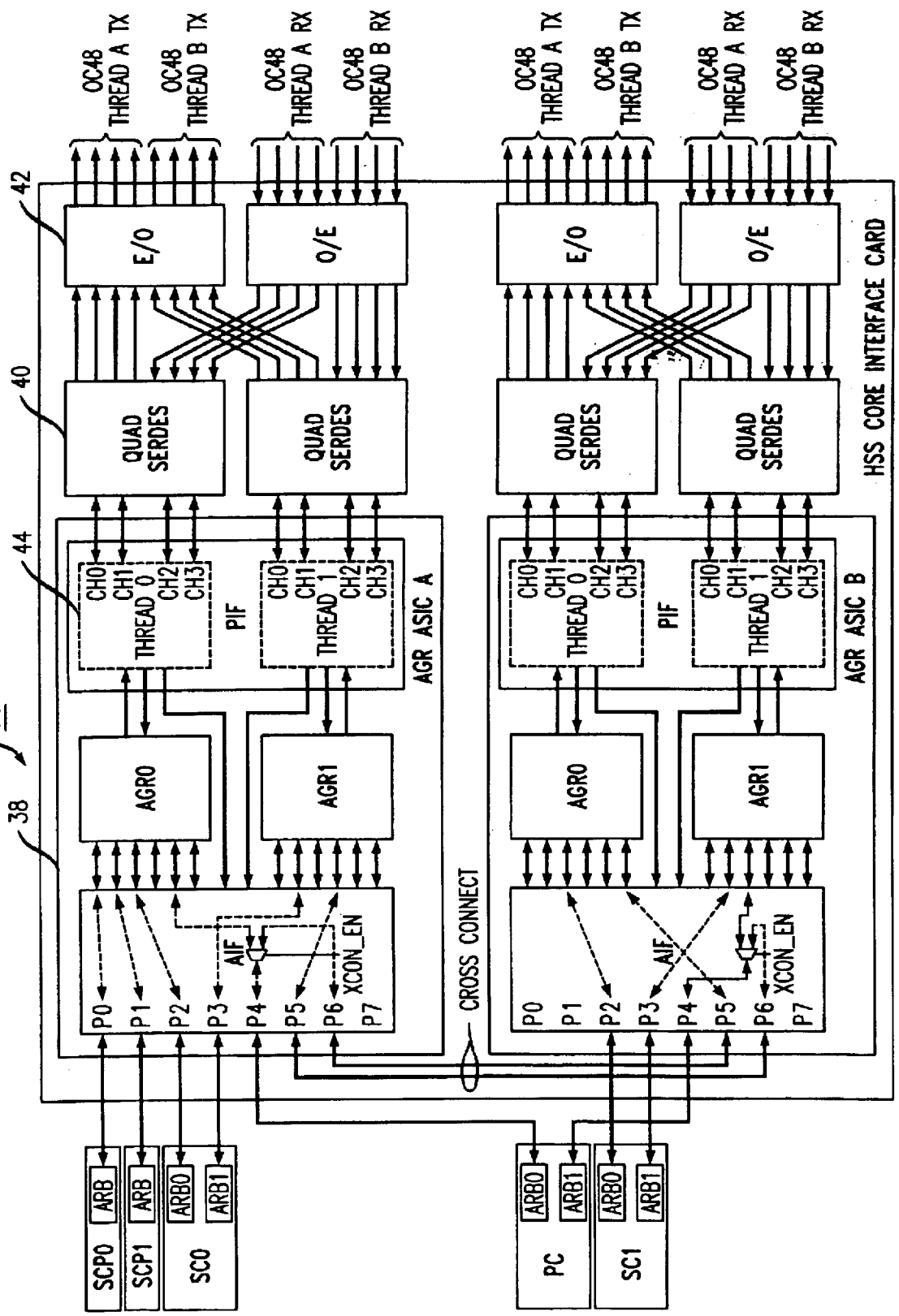
FIG. 3 is an exemplary block diagram of a core interface card for a high speed shelf.

The core interface cards 14 couple to redundant switch cores 16, 18. A core interface card 14 monitors its link to the core and reports status to the shelf control processor 36 on the service shelf. Referring to FIG. 3 in combination with FIG. 2, an exemplary block diagram of a core interface card 14 is shown. As shown, service cards 24, 26 couple to the core through an aggregator device 38 in the core interface card 14. Interconnections between the aggregator in the core interface and the arbiter blocks on the service cards are illustrated with double arrows. (FIG. 2).

The aggregator device 38 acts as an interface between the service cards 12 and the switching core and essentially distributes core traffic throughout the service shelf. The aggregator 38 acts a datapath flow switch, directing flows to either the normally active service card slot or to the dedicated protection slot. In all cases, the aggregator 38 will allow control information connectivity through the core to all attached service cards 24, 26 and shelf control processors 36. Although shown and described as an applications specific integrated circuit (ASIC), it would be understood that the functionality of the aggregator 38 as described herein may also be implemented using discrete components. As shown in FIGS. 2 and 3, the core side of the aggregator 38 couples to multiple serializer/deserializer blocks 40. The implementation and function of a serializer/deserializer would be well known to a person skilled in the art. The serializer/deserializers 40 couple to optical/electrical (O/E) components 42 in order to provide the interface to the switching core. Failure of a link will be detected by a serializer/deserializer 40 or the aggregator device 38 and reported to the shelf control processor 36 through a control interface on the aggregator. Failures may be detected, for example, by the loss of a clock signal corresponding to the link or an invalid parity across the link. Other types of failures that are detectable and that can be characterized as a link failure would be apparent to those skilled in the art. As will be explained, the shelf control processor 36 (in combination with the aggregator 38) trigger appropriate corrective action in response to a link failure. The aggregator 38 on the core interface card 14 also contains a thread switch function 44 for service card protection. The switch function 44 allows the core interface card 14 to steer traffic on a given thread to/from an active service card to a protection card. For the shelf, service card protection will be 1:2. The core interface card 14 (and the shelf control processor 36) will control the protection switching of the interface. In addition, as will be explained, an arbiter function on the service card can detect link failures on the basis, for example, of the receipt/non-receipt of link test cells.

Figure 4:
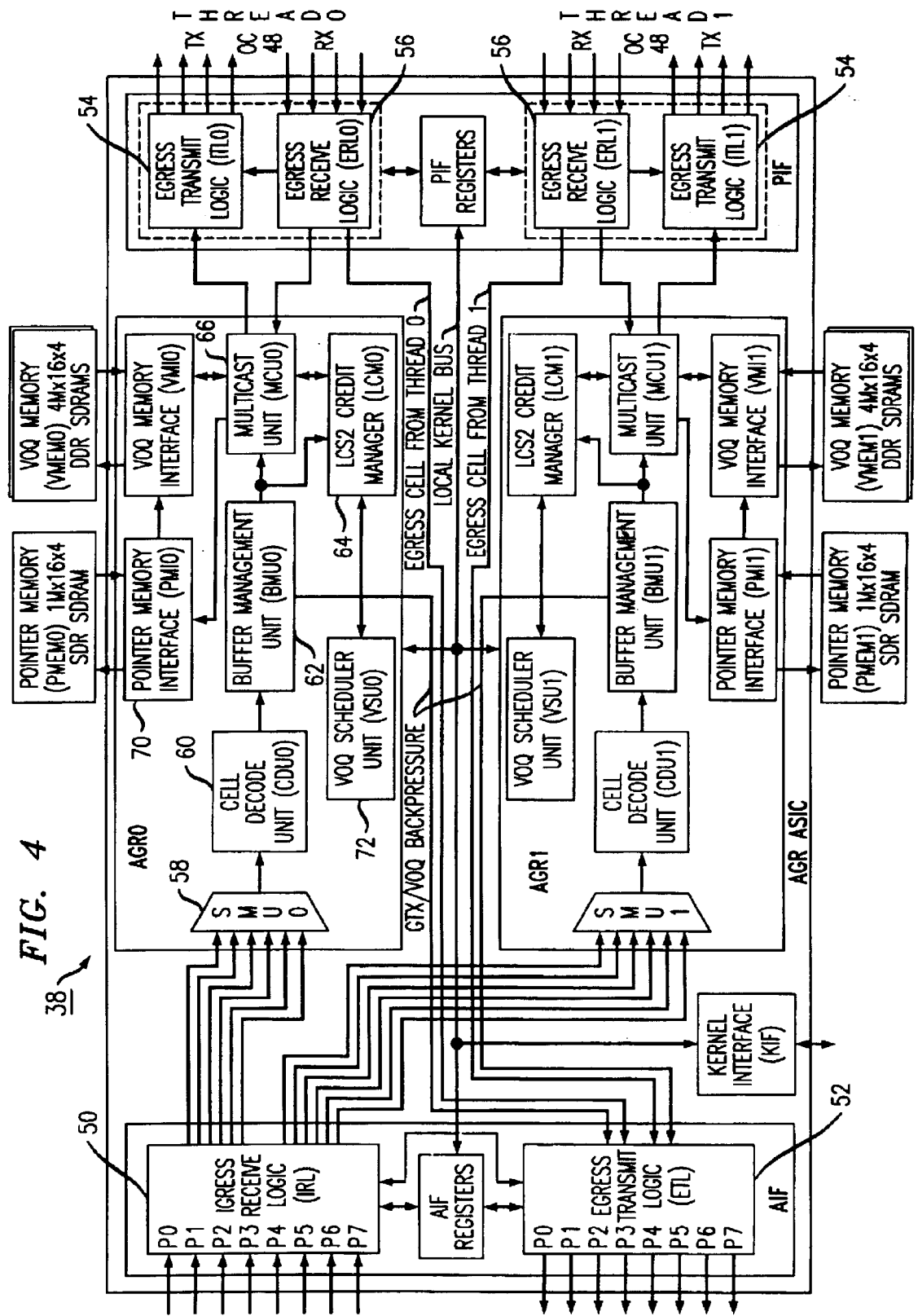
FIG. 4 is an exemplary block diagram of an aggregator function as used in connection with the present invention.

FIG. 4 shows a functional block diagram of the aggregator device 38. The aggregator 38 includes ingress receive logic 50 and egress transmit logic 52 on the service card side. Ingress transmit logic 54 and egress receive logic 56 are also found on the core side of the aggregator 38. There are two aggregation functions—AGR0 and AGR1—implemented in the aggregator (AGR) ASIC, each performing an aggregation of up to 6 independent data streams into a 2.5 Gbps thread. These two aggregation functions are independent and the operation of one does not affect any state of the other. In one exemplary embodiment, each aggregator function AGR0, AGR1 includes a multiplexer unit 58 which couples to the ingress receive logic 50, a cell decode unit 60 which couples to the output of the multiplexer 58 and a buffer management unit 62 which couples to the output of the cell decode unit 60. A credit/grant manager function 64 and a multicast unit 66 each couple to the output of the buffer management unit 62. A virtual output queue (VOQ) memory interface 68 and a pointer memory interface 70 each couple to the multicast unit 66. A VOQ scheduler 72 couples to the credit/grant manager 64.

The AGR ASIC communicates with the service shelf cards through an arbiter (ARB) ASIC 76 over an 8-bit LVDS (low voltage differential signal) interface (FIG. 2). This interface runs, for example, at 266 MHz with data being transferred on both clock edges. As shown, the AGR ASIC has 8 ARB interface (AIF) ports. Four of these AIF ports can be configured to connect to either of the aggregation functions in the AGR ASIC. Of the remaining four AIF ports (P0–P7), two are connected to aggregation function 0 (AGR0) and the other two are connected to aggregation function 1 (AGR1). Thus, a maximum of six AIF ports can be connected to each aggregation function. In the ingress direction, each aggregation function statistically multiplexes a combination (maximum of 6 data streams) of OC-12, 2×OC-12, and OC-48c data streams into a 2.5 Gbps stream. In the egress direction, each aggregation function broadcasts an OC-48 thread coming from the core to the six (6) ARB ASICS connected to that thread.

As discussed above, the AGR ASIC communicates with the switch core, for example, on OC-48 links through quad serializer/deserializer (Serdes) 40 and Optical/Electrical ports 42. The Serdes transmitter 40 serializes and encodes the data, e.g. 8B10B data, for proper transmission over the fiber link. The receiver will deserialize, decode and also synchronize the four channels (channel lock) before transmitting the data to the aggregator (AGR) ASIC 38. Optical/Electrical components take the electrical signals produced by the Serdes and convert them to optical signals for fiber link transmission and take optical signals from the link and convert them to electrical signals for Serdes processing. In one embodiment of the invention, for example, a 96-byte data cell is striped among four channels. This data cell includes the 84-byte packet and 12-bytes of control data. Data is transferred between the aggregator ASIC and each Serdes on a 4×8-bit unidirectional bus. This cell is transmitted in twenty-four 155.52 MHz-clock cycles.

The AGR ASIC 38 is used in high speed and low speed applications, where the respective service shelves are accordingly termed high speed service shelves (HSS) and low speed service shelves (LSS). In the HSS and LSS applications, the AGR 38 resides in the HSS and LSS core interface cards, respectively. In the exemplary embodiment of the high speed shelf 12, the core interface card in the HSS uses two AGR ASICS 38 and provides 10 Gbps (4×2.5 Gbps) interface to the switch core. In the exemplary embodiment of the low speed shelf (see FIG. 5), the core interface card 80 in the LSS uses one AGR ASIC 38 and provides 5 Gbps (2×2.5 Gbps) interface to the Switch Core. The AGR is software configurable based on the specific application.

In the exemplary embodiment, the AGR ASIC includes 8 AGR-ARB interfaces each with a data rate of OC-48. All of the eight AGR-ARB interfaces (AIF ports P0 through P7) are software configurable to operate the AGR ASIC in different configurations required for different shelves (e.g. the High-Speed Shelf and Low-Speed Shelf). Setting a corresponding port enable bit in AIF Port Control Register 0 & 1 can activate each interface. AIF ports P0 & P1 are connected to the aggregation function 0 (AGR0) and ports P6 & P7 are connected to aggregation function 1 (AGR1). Ports P2 through P5 can be connected to either aggregation functions (AGR0 or AGR1), depending upon the AGRn_SEL bit in the AIF Port Configuration Register. Therefore, at any time at most 6 AIF ports can connect to one OC-48 thread.

In the high-speed shelf, the core interface card 14 has two AGR ASICs 38 (AGR-A and AGR-B) residing on it and provides an aggregate bandwidth of 10 Gbps to the core. Each AGR ASIC 38 is connected to one 5 Gbps high-speed service card and to one of the two 2.5 G ARB interfaces on the protection card. One of the two AGR ASICs will also have a shelf control processor (SCP) card(s) connected to it. Each SCP has an average data rate of 622 Mbps (OC-12).

Figure 5:
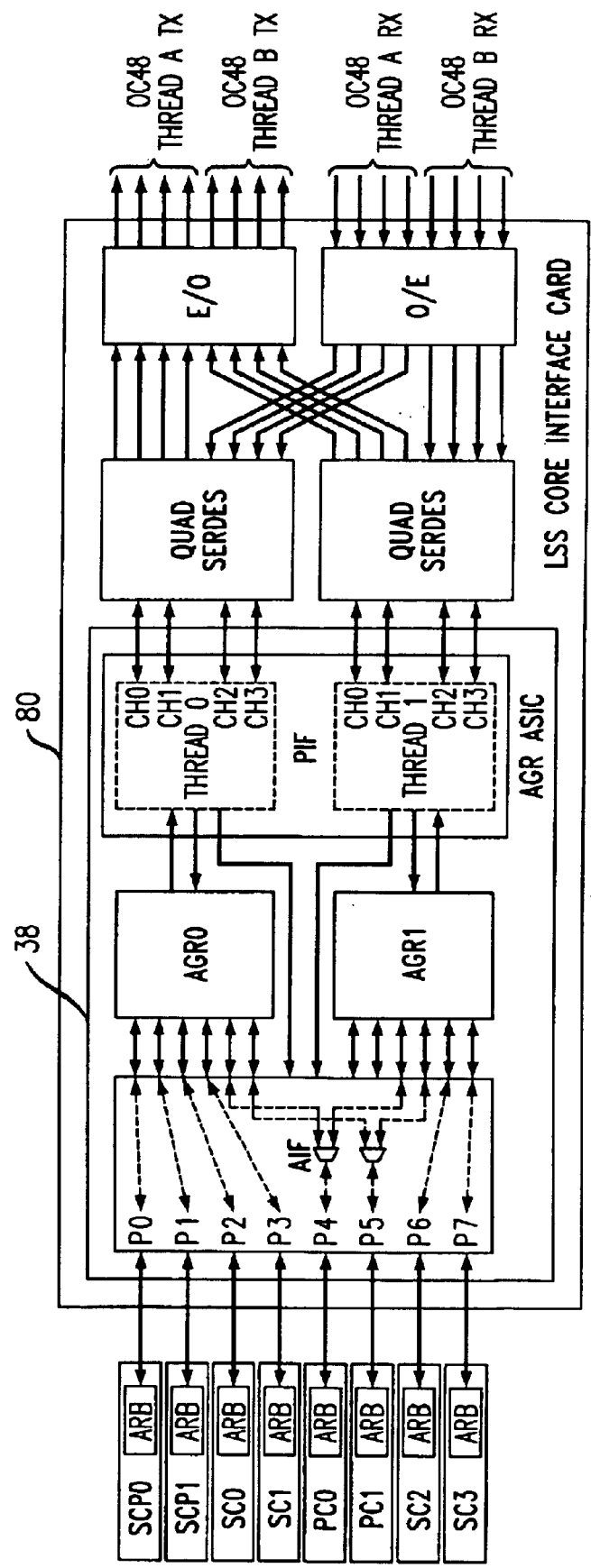
FIG. 5 is an exemplary embodiment of a core interface card for a low speed shelf.

In the low-speed shelf (FIG. 5), the core interface card 80 has one AGR ASIC 38 and provides two 2.5 Gbps aggregated threads to the core. The AGR ASIC interfaces with the ARB ASIC in 4 low-speed service cards, 2 protection cards, and 2 shelf control processor (SCP) cards. All low-speed cards have an average data rate of 2×OC-12, however, in burst traffic conditions, the interfaces can support a peak data rate of OC-48. FIG. 5 shows AGR in LSS core interface card.

Referring again to FIGS. 1 and 2, it can be seen that the service cards 24, 26 will receive flows from the redundant cores through the core interface card 14. An arbiter function (ARB) 76 in the service cards 24, 26 will monitor the end to end path of the flows through special in-band test messages over both cores. If a flow is failed, the destination ARB will automatically switch and accept traffic through the protection path from the redundant core and core interface card. The source ARB will always broadcast traffic and test messages through both cores. The AGR interfaces with an Arbiter device/circuit that resides on all service cards and shelf control processors 36 to complete the core interface. From a high level the ARB 76 is intended to merge traffic flows from each core as necessary, on a per flow basis, and act as a header translator and filter for traffic flows from the cores. The ARB and AGR will also provide flow checking and fault detection checking. A significant advantage of the present invention is the ability to switch individual flows without impacting other flows within the switching system.

Figure 6:
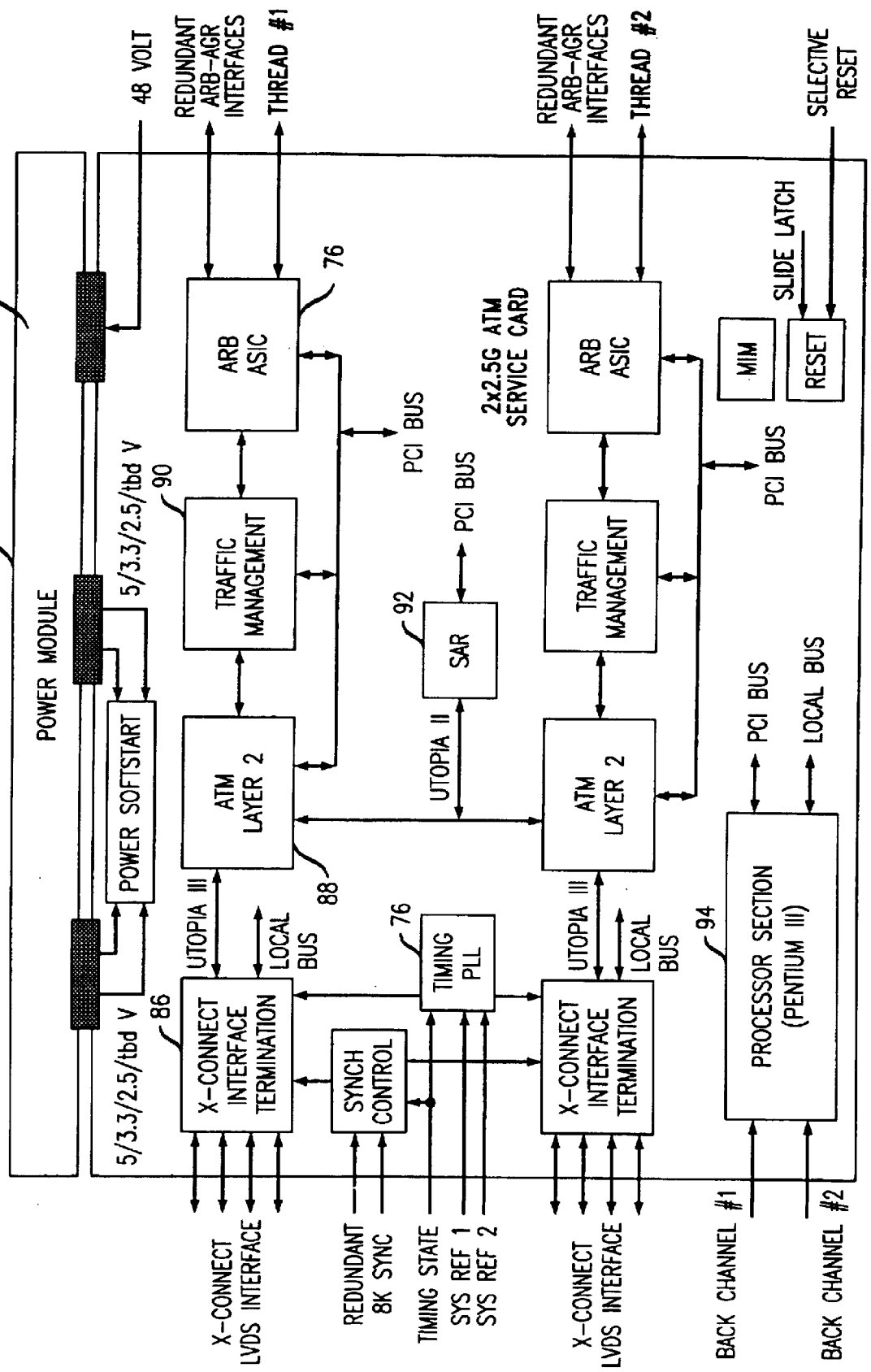
FIG. 6 is an exemplary embodiment of a higher level service card as used in connection with the present invention.

Referring to FIG. 6, one exemplary embodiment of a high level service card 12 is shown. As illustrated, the service card is an ATM service card, although it would be understood that other types of service cards, for example IP, frame relay, and TDM. The service card shown provides 2×2.5 Gbps threads and provides the ATM layer and traffic management functions for the service shelf. As shown, cross connect interface terminations 86 couple to the ATM (layer 2) processing blocks 88. The ATM blocks 88 couple to respective traffic management functional blocks 90 as well as to the ARB ASIC 76 providing the two threads. The ATM layer blocks 88 also couple to a segmentation and reassembly function (SAR) 92 that couples to a local processor 94 via a PCI bus. The service card also includes timing and power functions 98.

The Arbiter ASIC, or ARB ASIC 76, will be used in the switching system as a flow control mechanism for cell traffic as well as a test cell generator and receiver for system level flow verification. As with the aggregator device, although the exemplary embodiment is described with respect to an ASIC, it would be understood that such a device may also be implemented using discrete components. The ARB is utilized, for example, in the high speed shelf, the low speed shelf, and interfaces on one side to a physical layer device such as a scheduler, also known as a traffic manager or TM. On the opposite side, the ARB interfaces to the aggregator (AGR). The ARB ASIC includes a UTOPIA II bus for interfacing with a SAR for processor to processor communication. The ARB also supports an external memory interface for GMID (global multicast ID) to ECID (egress circuit ID) translation. The ARB ASIC contains a test cell generator and a test cell receiver to test online and off-line cell flows through the core.

The ARB resides on a service card and forwards user traffic (from the physical interface) to the core interface cards at an OC48 (2.5 Gbps) rate. The ARB receives traffic from the core interfaces and will forward traffic destined to its TM device. An ARB also resides on the SCP. In the SCP application, the ARB interfaces to a SAR device to enable processor to processor communication and will not interface to a TM device.

Figure 7:
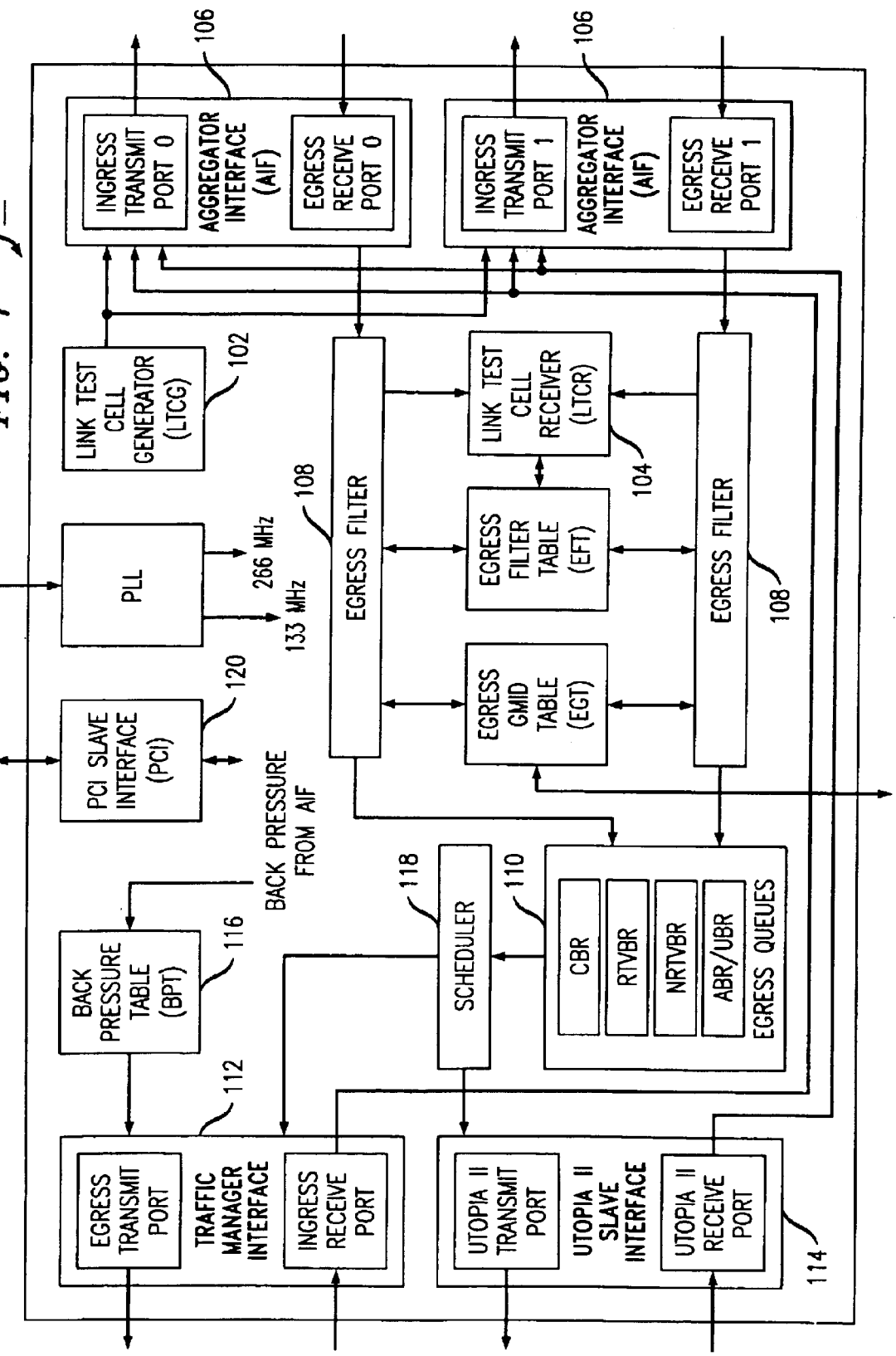
FIG. 7 is an exemplary block diagram of an arbiter function as used in connection with the present invention.

Referring to FIG. 7, a functional block diagram of the ARB ASIC 76 is shown. The exemplary embodiment of the ARB includes six interfaces: a PCI (processor interface) interface, a physical layer interface (PI Sched RX and TX), a SAR interface (RX and TX), two AGR interfaces (RX and TX, one per core) and an external memory interface. As discussed previously, the ARB includes a link test cell generator 102 and a link test cell receiver 104 which will be used in the system to verify flow integrity. The link test cell (LTC) generator 102 and receiver 104 couple to the aggregator interface 106, the link test cell receiver 104 coupling through respective egress filters 108. The. ARB also includes internal priority queues (four QOS levels) 10 for egress traffic, the inputs of which couple to the egress filter 108. The priority queues couple to egress transmit ports (TM and Utopia) 112, 114 through a scheduler 116 or 118. The egress filters 108 in the ARB provide a filtering function that is used to determine if the ARB should accept unicast and multicast cells from the AGRs.

The ARB 76 operates in one of two modes. If the ARB resides on a service card (either in the high speed shelf or the low speed shelf), the ARB will be in TM mode in which all traffic is sent and received via the TM device or via the test cell interface. If the ARB resides on a processor card the ARB will be in SAR mode in which all traffic will be sent and received via the SAR or via the test cell interface.

From an ingress standpoint (with relation to the core), if the ARB 76 is in TM mode, user cells will enter through the physical layer interface TM. BIP8 calculations (bit interleaved parity across 8 bit boundaries) will be checked on a per cell basis and optionally drop BIP8 erred cells. Cells entering the ARB through the physical layer interface will be broadcast to both AGR ports (and sent to both cores). Internally generated link test cells will be combined with the user traffic in the ARB ASIC and sent to both AGR ports. The link test cell generator 102 can optionally back pressure the TM device using a back pressure table 116 to create space for test cell insertion. If no user cells or test cells exist, idle cells will be inserted to sustain the flow.

If the ARB is in SAR mode, cells will be accepted from the SAR device and the TM interface will be ignored. Again, the SAR cells will be combined with the internally generated test cells and sent to both AGR ports.

From an egress standpoint, cells will enter the ARB via one of two AGR interfaces. When a cell first enters the ARB, a check will be done to determine if the cell is a test cell, a unicast cell, a multicast cell, or an idle cell. Filters and checks will be done to forward the cell to the appropriate interface (TM/SAR or LTC receiver). BIP8 calculations will be checked on a per cell basis and optionally drop BIP8 erred cells. Cells destined for the TM/SAR are placed in one of four priority queues 110 based on a QOS field in the cell. Cells from both AGR interfaces are placed into the same queues. Cells will be read from the priority queues based on either a fixed priority or a programmable priority depending on scheduler mode and sent to the TM or SAR based on mode.

The egress queue back pressure mechanism will exist to prevent the egress priority queues from overflowing. Back pressure information will be inserted into the ingress path back to the AGRs. The ARB will also track and forward back pressure information from the AGRs to the TM device.

The PCI interface 120 provides access to on chip register and tables as well as off chip memory. In an exemplary embodiment, the PCI interface will be 32 bits wide and support a maximum frequency of 33 MHz. Burst access will be provided to on chip tables and off chip memory when the corresponding function is not enabled.

In accordance with the present invention, it can be seen that at the service shelf (SS) level the core interface cards are redundant on a per core basis. The service cards (SC) are 1:N redundant, (e.g., 1:2) without wasting core bandwidth. The AGR provides support for 1:N service card redundancy in the HSS and LSS applications. FIG. 3 and FIG. 5 depicted the AGR in the high-speed and the low-speed configurations. In the HSS application (see FIG. 3), the core interface card 14 connects to one protection card (PC) that can protect any one of two service cards (SC0 and SC1). In the LSS application (see FIG. 5), the core interface card 80 connects to two protection cards (PC0 and PC1) each can protect any of the four service cards (SC0, SC1, SC2, and SC3).

In the HSS application, as shown in FIG. 3, ARB0 and ARB1 of the SC0 and ARB0 of the PC are connected to AGR ASIC-A. Similarly, ARB0 and ARB1 of the SC1 and ARB1 of the PC are connected to AGR ASIC-B. Since there are two service cards (SC0 and SC1) each connected to two different AGR ASICs and there is only one protection card (PC) to protect them, a cross-connect is needed between two AGR ASICs on the HSS CIC card. When PC is protecting the SC0, PC-ARB0 protects SC0-ARB0 directly and PC-ARB1 protects SC0-ARB1 indirectly through the external cross-connect. Conversely, when PC is protecting the SC1, PC-ARB1 protects SC1-ARB1 directly and protects SC1-ARB0 indirectly through the external cross-connect. The cross-connect enable bit (XCON_KEN) in the AIF Redundancy Register is provided to enable and disable the external cross-connect. When enabled, the protection port on the AGR ASIC protects the "remote" ARB connected through the external cross-connect. When XCON_EN is disabled, the protection port on the AGR would protect the "local" ARB. For example, if the $XCON_{13}$ EN bit in AGR ASIC A is enabled, PC-ARB0 would protect SC1-ARB0 through the external cross-connect. If the XCON-ENbit in AGR ASIC A is disabled, PC-ARB0 would protect SC0-ARB0. This XCON-EN bit is used in HSS applications only and it should be disabled in LSS and NEP applications.

In the LSS application (see FIG. 5), since there is only one AGR ASIC on the core interface card, external cross-connect is not needed. Therefore, the XCON EN bit is disabled and only AGRn_SEL bits for the protection ports are used to configure the protection ports. On the ingress side, data from a protection card can go to one of two OC-48 threads to the switch based on the card it is protecting. Similarly, on the egress side, data from one of two threads can now go to a protection card. The AGRn_SEL bit (in AGRn Port Configuration Register) associated with the protection port is used to select one of two threads. This bit is set by the processor during switchover.

As discussed, support for 1:N service card redundancy is provided in the AGR 38. In the described embodiments of the HSS and the LSS one protection card (a hot standby) is provided for every two service cards. In order to provide the redundancy protection and allow for seamless traffic switchover between the protection card and service card, an address mapping scheme, termed a Z-mapping scheme (after the different address fields) is implemented.

All the ARB ASICS 76 in a switch utilizing the present invention interface are uniquely identified from a flow/connection standpoint based on an X.Y.Z addressing scheme. The X portion of the address represents an 8-bit OC192 port D used for addressing one of 256 fabric output ports. A 2-bit Y field addresses the four OC 48 ports within an OC 192 port addressed by X. That is, Y specifies one of the four OC48 links between the switching core and a core interface card. A 3-bit bit Z field addresses an ARB ASIC or AIF port associated with an OC48 thread (PIF thread). The X.Y.Z value is stored in the packet header and is used by the switch fabric in the core and the line card on the service shelf to route packets to the correct destination card/port.

On the egress side, all user data cells and test cells received from the core are broadcast to all ARBS associated with an OC48 PIF thread. These cells contain a 3-bit $E_{13}$ Z (egress) field that identifies one of 8 destination ARBs connected to the AGR. Each ARB also has a unique Z ID stored in its Z[2:0] register. Upon receiving a cell from the AGR, the ARB compares the E_Z[2:0] field of the incoming cell with its Z ID. If the Z values match, the cell is processed, otherwise the cell is dropped.

When a service card fails, the associated egress traffic is switched to a protection card. In order to accomplish the switching, the AGR uses a 3-bit wide, eight entry deep Z-mapping table with each entry associated with one of the eight AIF ports. Each entry in the Z-mapping table contains the current mapped/unmapped Z address of the corresponding AIF port. The egress transmit logic in the AGR receives a cell from the egress receive logic, it looks up the Z mapping table used to overwrite the E_Z field of the outgoing egress cell. During normal operation, each entry in this table contains the Z address of the ARB connected to the associated AIF port. When one of the service cards fails, the Z address of the failed card and the protection card are swapped by the associated software. The Z address of the failed service card is now mapped to the Z address of the protection card and vice versa. Consequently, the egress traffic destined for the failed service card will now be accepted by the protection card.

It is desirable to have the Z-mapping table lookup disabled for test cells. For example, when a service card is being protected, it must still be able to receive test cells destined to it. Thus, test cells destined for the failed service card must not be mapped whereas user data cells destined for the same card must be mapped. The IGNR_Z bit in the egress cell header is therefore provided to override the Z-mapping lookup table. Hence, the Z-mapping table lookup will only be performed when the IGNR_Z bit is set to 0.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. An interface device for coupling a group of service cards of a packet based switch to a switching core thereof, said group of service cards including one or more on-line service cards and one or more protection cards, said device comprising:
   a plurality of core side input and output ports for coupling to said switching core and a plurality of card side input and output ports for coupling to said service cards;
   a data flow switch function coupled between said core side pots and said card side ports, said data flow switch function operable to complete data flow paths between said core side ports and said card side ports; and
   a link failure detector operable to detect a communications failure on a communications link associated with one of said on-line service cards, said link failure detector further operable to alter said data flow switch function such that one or more of said data flow paths associated with one of said on-line service cards are switched to one of said protection cards.

2. The device of claim 1, wherein a bandwidth allotment between said service cards and said interface device is greater than available bandwidth between said switching core and said interface device, thereby enabling connection of said protection cards without corresponding usage of switching core bandwidth.

3. The device of claim 1, further including an aggregation function coupled between said card side ports and said core side ports, said aggregation function operable to combine multiple data streams into larger bandwidth threads.

4. The device of claim 3, wherein said data flow switch function switches threads between said on-line cards and said protection card.

5. The device of claim 1, further including a digital processor coupled to said link failure detector, said digital processor being coupled to said data flow switch function to control the activation thereof in response to detection of a link failure.

6. The device of claim 5, wherein each of said service cards is assigned an address, each packet traversing said switch also having an address, wherein upon detection of a link failure, said processor is operable to swap the address of one or more of said ports assigned to a failed on-line service card with that of said ports assigned to a protection service card to thereby accomplish data flow switching to said protection card.

7. The device of claim 6, wherein said data flow switching is accomplished on a per flow basis, data flow switching of one particular flow not affecting other different flows in said switch.

8. The device of claim 6, wherein said address swap of on-line service card and protection card is accomplished in a look-up table.

9. The device of claim 6, wherein said address is a hierarchical address scheme having multiple fields pertaining to various type links within said interface.

10. The device of claim 1, wherein said link failure detector includes a monitor to detect failures selected from the group consisting of bit interleaved parity, parity, and CRC.

11. The device of claim 1, wherein said link failure detector includes a receiver for monitoring per flow test cells.

12. The device of claim 1, wherein said service cards are layer 2 or layer 3 cards.

13. The device of claim 12, wherein said service cards are selected from the group consisting of ATM, IP frame relay and TDM.

14. The device of claim 12, wherein said service cards include traffic management functionality.

15. The device of claim 13, wherein said interface device includes at least one serializer/deserializer coupled to said aggregator.

16. An interface device for reducing the amount of core bandwidth necessary to be allotted to support both on-line service cards and back up protection cards in a multiservice switch said device being coupled between said service cards and said switching core, said device comprising:
   a first plurality of input and output ports for coupling to both said on-line service cards and said protection cards;
   a second plurality of input and output ports coupled to said switching core;
   a data flow switch function coupled between said first plurality of input and output ports and said second plurality of input and output ports;

a link failure detector also coupled between first plurality of input and output ports and said second plurality of input and output ports; and a controller coupled to said link failure detector and said data flow switch function, said controller operable to switch a data flow route between said service cards and said switching core from one of said on-line service cards to one of said protection cards upon detection of a link failure by said link failure detector.

17. The device of claim 16, wherein a bandwidth allotment between said service cards and said interface device is greater than the available bandwidth between said switching core and said interface device, hereby enabling connection of said protection cards without corresponding usage of switching core bandwidth.

18. The device of claim 16, further including an aggregation function coupled between said first plurality of ports and said second plurality of ports, said aggregation function operable combine multiple data streams into larger bandwidth threads.

19. The device of claim 16, said data flow switch function switches threads between said on-line cards and said protection card.

20. The device of claim 16, wherein said data flow switching is accomplished on a per flow basis, data flow switching of one particular flow not affecting other different flows in said switch.

21. The device of claim 16, wherein each of said service cards is assigned an address, each packet traversing said switch also having an address, wherein upon detection of a link failure, said processor is operable to swap the address of one or more of said ports assigned to a failed on-line service card with that of said ports assigned to a protection service card to thereby accomplish data flow switching to said protection card.

22. The device of claim 21, wherein said address swap of on-line service card and protection is accomplished in a look-up table.

23. The device of claim 21, said address is a hierarchical address scheme having multiple fields pertaining to various type links within said interface.

24. A method of coupling equipment specific service cards to a switching core in a multiservice switch in order to conserve switching core bandwidth, said method comprising the steps of:

coupling on-line and protection service cards to said switching core through a core interface device, said core interface device including a data flow switch function for coupling service card side ports with core side ports thereof, said core interface device providing a given redundancy ratio of protection cards to on-line service cards;

detecting a link failure associated with an on-line protection card; and altering said data flow function in response to detection of said link failure to provide one or more data flow paths from said on-line service cards to said protection service cards.

25. The device of claim 24, wherein a bandwidth allotment between said service cards and said interface device is greater than the available bandwidth between said switching core and said interface device, thereby enabling connection of said protection cards without corresponding usage of switching core bandwidth.

* * * * *